UNITED STATES PATENT OFFICE.

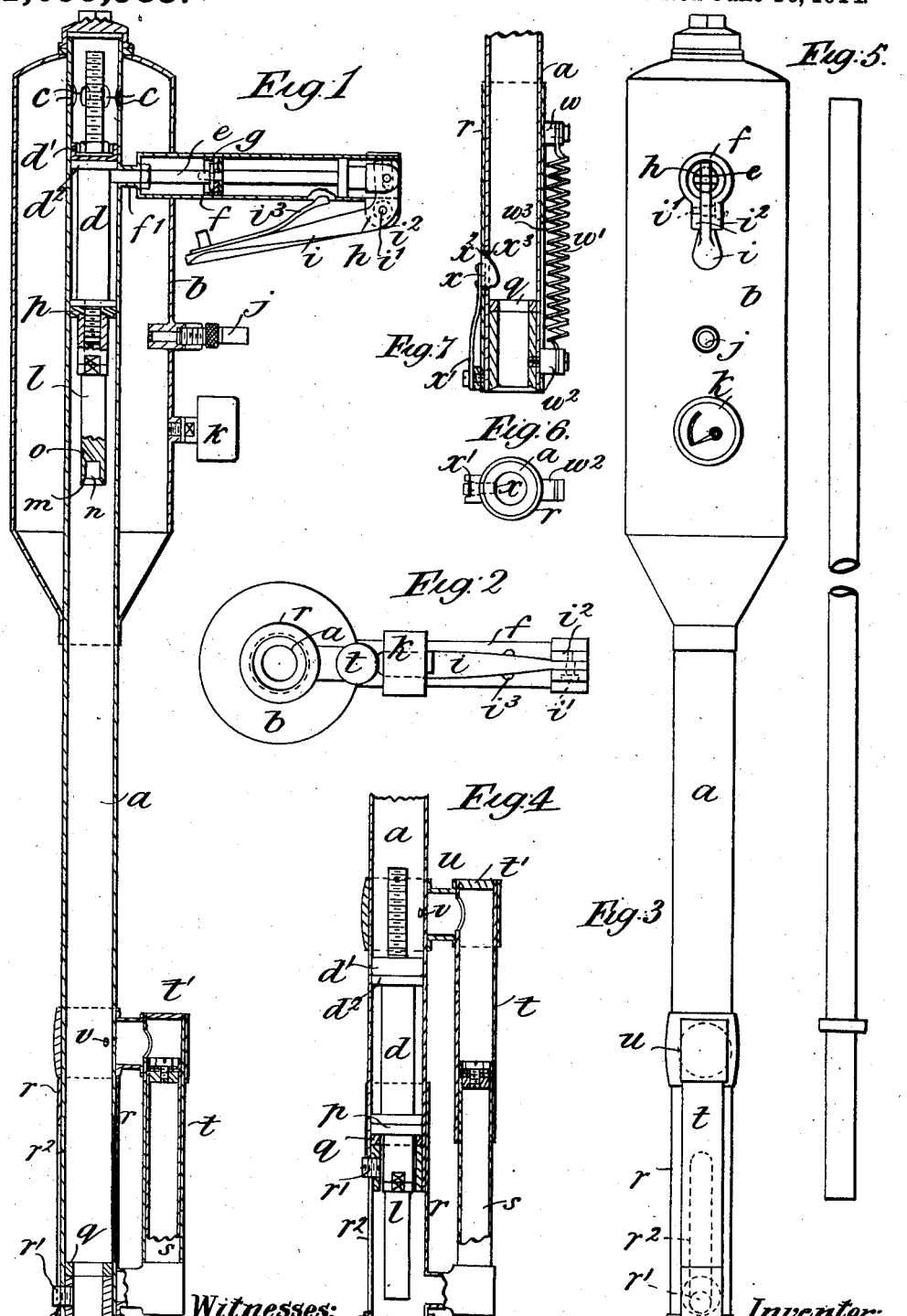

CHARLES RANSOM, OF LONDON, ENGLAND.

APPLIANCE FOR SLAUGHTERING CATTLE AND LIKE ANIMALS.

1,099,935. Specification of Letters Patent. Patented June 16, 1914.

Application filed August 9, 1913. Serial No. 783,659.

*To all whom it may concern:*

Be it known that I, CHARLES RANSOM, a subject of the King of Great Britain, residing in London, England, have invented certain new and useful Improvements in Appliances for Slaughtering Cattle and like Animals, of which the following is a specification.

My invention relates to apparatus for slaughtering cattle, horses and other animals, and has for its object to provide an instrument by means of which the killing of such animals can be effected in a more humane and cleanly fashion than has hitherto been possible.

To this end according to my invention, I provide an appliance which comprises a barrel or tube which is in communication at one end with a reservoir of compressed air, the said barrel being designed to receive a plunger or piston which carries at its front end a striking-bolt or the equivalent designed to perforate the head of the animal to be slaughtered. The plunger or piston is normally held in its withdrawn or innermost position by means of a trigger-released catch or the like, and on the trigger-catch being released the plunger is propelled forward and so forces the striking-bolt into the head of an animal against which the muzzle end of the appliance is placed. In practice, means are advantageously provided whereby the striking-bolt can be withdrawn from the animal's head immediately it has entered the same, so that the animal is free to fall immediately the blow is struck. To this end I provide a sleeve which is slidably mounted upon the muzzle end of the barrel or tube of the appliance, the said sleeve carrying a plunger, rod or the like, the axis of which is parallel to the sliding sleeve and which enters one end of a tube or cylinder, the other end of which is closed and is in communication with the barrel through an aperture or apertures formed in the said barrel at a point such that the said aperture or apertures is or are uncovered when the piston has been propelled fully forward in the barrel. With this arrangement, assuming the muzzle of the barrel is placed against the animal's head and that the piston is propelled forward so as to cause the striking-bolt to penetrate the animal's head as above described, as soon as the said piston has passed the aforesaid apertures, the compressed air in the barrel passes into the tube or cylinder carrying the plunger of the sliding sleeve and so forces forward the said sleeve, the front end of which, by bearing against the animal's head, pushes back the barrel of the appliance and so withdraws the striking-bolt from the animal's head. The striker can then be forced back into its initial position in which it is retained by the trigger-catch through the medium of a rod which is inserted into the muzzle of the barrel. The sliding sleeve can then be also returned to its initial position whereupon the appliance is ready for re-use. In a modified arrangement the withdrawal of the striker from the head of the animal is effected by mechanical means directly operated or released by the advancing striker. For this purpose a suitable construction consists in mounting a sliding sleeve upon the muzzle end of the barrel, the said sleeve being initially slid on to the barrel so that its outer end is coincident with that of the barrel, in which position the sleeve puts into tension a spring, one end of which is secured to its rear end and the other to a pin projecting from the barrel and engaging a slot in the sleeve. The sleeve is held in the retracted position by means of a spring catch which passes through a slot in the said sleeve and in the barrel, and is formed with a curved or inclined surface at that part which protrudes into the barrel. With this arrangement when the striker is projected forward under the air pressure it comes into contact at the end of its stroke with the aforementioned inclined face of the catch which it presses outward so as to release the sleeve from engagement with the barrel, the said sleeve being thereupon immediately pulled forward under the action of the stretched spring so as to withdraw the striker from the head of the animal in the manner hereinbefore described. This arrangement has the advantage over that above described that no leakage of air takes place at the muzzle end of the barrel, and in practice means may also be adopted whereby leakage of air is minimized at the reservoir end of the appliance.

To enable my invention to be fully understood, I will describe it by reference to the accompanying drawings, in which:—

Figure 1 is a longitudinal section of an appliance made according to the invention. Fig. 2 is an end view of the appliance. Fig. 3 is an underside view thereof, and Fig. 4 is a sectional view of the muzzle end of the appliance showing the striker and the tube projected. Fig. 5 is an elevation of a suitable rod for returning the striker to the initial position, and Figs. 6 and 7, are respectively an end view and a longitudinal section of the modified construction of striker withdrawing device.

Referring first to Figs. 1 to 5, $a$ represents the barrel or tube which at its rear end enters the reservoir $b$ which is also of a cylindrical shape and is concentrically arranged around the rear end of the said barrel or tube $a$ to which it is secured in any suitable way, and with the rear end of which it is in communication through the medium of the holes $c$, $c$ in the said barrel. $d$ is the piston or plunger which fits in the barrel $a$ and which is packed by means of the packing ring $d^1$ in the ordinary way. $e$ is the catch for retaining the piston $d$ in the withdrawn position, shown in Fig. 1. The catch illustrated is in the form of a rod, the inner end of which is mounted in a casing $f$ which enters the reservoir $b$ and is provided with a neck $f^1$ by means of which it is in communication with the barrel $a$, so that the rod $e$ can pass through into the said barrel and engage with the terminal flange $d^2$ upon the piston $d$, as is clearly shown in Fig. 1. The rod $e$ is provided with a piston $g$ which fits air tightly in the casing $f$, so as to prevent an escape of air from the reservoir $b$, and the outer end of the said rod engages a forked end $h$ of the trigger lever $i$ which is pivoted at $i^1$ to lugs $i^2$ upon the outer end of the casing $f$. It will be obvious that the user by grasping the casing $f$ and trigger $i$ can pull the said trigger toward the casing against the action of the spring $i^3$, and thus depress the rod $e$, thereby releasing the piston $a$ which is then free to be projected forward by the compressed air contained in the reservoir $b$. The requisite compressed air is introduced into the said reservoir through the filling valve $j$ which is constructed, as illustrated, of a form to permit of a pump of the bicycle tire type being applied; the pressure of air in the reservoir can be indicated in the gage $k$. $l$ is the striking-bolt or striker which is secured to the front end of the piston $d$, the front end of the said striker being formed with a cutting edge $m$ and being formed with a recess $n$, the base of which is in communication with the surface of the striker by means of the oblique passage $o$. The passage $o$ permits the escape of air from the end of said striker as it enters the animal's skull. $p$ is a cushion or pad which is provided at the front end of the piston or plunger $d$ and $q$ is a similar cushion which is provided at the muzzle end of the barrel $a$. $r$ is the sleeve which is loosely mounted upon the muzzle end of the barrel $a$ relatively to which it is prevented from rotating by means of the pin $r^1$ upon the barrel, which engages the groove $r^2$ in the said sleeve. $s$ is the plunger which is attached to the sleeve $r$ so that its axis is parallel therewith and $t$ is the tube or cylinder in which the said plunger $s$ fits and which tube or cylinder is closed at its rear end at $t^1$ and is in communication by the neck $u$ and apertures $v$ with the interior of the barrel, $a$.

The appliance operates as follows, that is to say, assuming that the piston $d$ is retained in the withdrawn position, shown in Fig. 1 and that air at the required pressure has been stored in the reservoir $b$, the muzzle of the barrel $a$ is placed against the head of the animal to be slaughtered, and the trigger $i$ operated so as to release catch $e$ in the manner above described, whereupon the piston $d$ is propelled forward by the compressed air stored in the reservoir $b$, and forces the striker $l$ into the animal's head; the passage of the piston being arrested finally by the contact of the cushions $p$ and $q$. When the piston $d$ has reached this position, however, the apertures $v$ in the barrel $a$ have been opened to the compressed air in the said barrel which thus passes to the rear of the plunger $s$ which is thereby forced forward carrying with it the sliding sleeve $r$. As the front end of the sleeve bears against the head of the animal being slaughtered, the barrel $a$ is pushed backward thus withdrawing the striker $l$ from the animal's head so that the said animal is released from the appliance, this position of the parts is illustrated in Fig. 4. In practice the sequence of operations takes place so rapidly that the animal drops practically instantaneously after the trigger is pulled. The parts can be returned to the initial position by forcing back the piston $d$ against the pressure of air in the reservoir, this being easily effected by means of a tool such as the hollow rod illustrated in Fig. 5.

Figs. 6 and 7, illustrate a method of effecting the withdrawal of the striker from the head of the animal by means mechanically operated directly by the striker as it reaches the end of the barrel $a$. In this construction the sleeve $r$ which is mounted upon the end of the barrel $a$ is provided at or near its rear end with a pin $w$ to which one end of the spring $w^1$ is secured, the other end of the said spring being attached to the pin $w^2$ secured to the muzzle of the barrel $a$ and engaging in a slot $w^3$ in the sleeve, so that the said sleeve can move longitudinally on the barrel, and can be pushed backward on the said barrel into the position shown in Fig. 7, in which its front end is coincident with the muzzle end of the barrel and in which position the spring $w^1$ is in considerable tension. The sleeve is held in this retracted position by means of the catch $x$ the rear face of which is inclined as shown and which is mounted upon the end of the spring $x^1$ carried by the front end of the sleeve $r$, the said catch $x$ protruding through a hole $x^2$ in the sleeve and a hole $x^3$ in the barrel $a$ which are coincident with one another when the sleeve is in the position indicated. The sleeve and barrel are thus held by the said catch in the retracted position. With this construction, on the striker $l$ being projected forward by the air pressure as hereinbefore described it comes at the end of its stroke into contact with the inclined face of the catch $x$ which it presses outward so as to disengage the sleeve $r$ from the barrel $a$, whereupon the said sleeve is immediately pulled forward under the action of the spring $w^1$, thus withdrawing the striker from the head of the animal in a manner similar to that effected by the appliance illustrated in Figs. 1 to 4. As above mentioned and as will be obvious there is no leakage of air at the muzzle end of the appliance as is the case with the foregoing arrangement, and this is of advantage in practice in cases, for example, where the appliance is required for dealing with a relatively large number of animals at any one time.

Claims:

1. An appliance for slaughtering cattle or other animals, comprising a barrel, a striker movable in said barrel, a compressed air reservoir in communication with the barrel, means for retaining the striker against the air pressure and releasing it to permit the said air to act thereon, means for checking the striker at the outer end of the barrel, and means for pushing the barrel back to effect the withdrawal of the striker from the animal.

2. An appliance for slaughtering cattle or other animals comprising a barrel, a striker movable in said barrel, a compressed air reservoir in communication with the barrel, means for retaining the striker against the air pressure and for releasing it to permit the said air to act thereon, means for checking the striker at the outer end of the barrel, a member slidable upon the end of the barrel, and means released by the striker for moving said member forward when the piston reaches the end of its travel.

3. An appliance for slaughtering cattle or other animals comprising a barrel, a striker movable in said barrel, a compressed air reservoir in communication with the barrel, means for retaining the striker against the air pressure and for releasing it to permit the said air to act thereon, means for checking the piston at the outer end of the barrel, a member slidable upon the end of the barrel, a spring acting upon the slidable member against the action of the spring until the striker reaches the end of its travel.

4. An appliance for slaughtering cattle or other animals comprising a barrel, a striker movable in said barrel, a compressed air reservoir in communication with the barrel, means for retaining the striker against the air pressure and for releasing it to permit the said air to act thereon, means for checking the piston at the outer end of the barrel, means for withdrawing the striker from the animal comprising a sleeve slidable upon the end of the barrel, a resilient member on said sleeve, a projection on said resilient member disposed in the path of the striker, a spring acting upon the sleeve and an abutment engaging the projection on the resilient member to hold the sleeve against the action of the spring until released by the striker.

5. An appliance for slaughtering cattle or other animals comprising a barrel, a piston in said barrel, a striker on said piston, a reservoir for compressed air surrounding one end of said barrel, a communication between the reservoir and the barrel, means for checking the piston at the outer end of the barrel, means for holding said piston against the air pressure, and for releasing it to permit said air to act thereon, and means for effecting the withdrawal of the striker from the animal.

6. An appliance for slaughtering cattle or other animals comprising a barrel, a piston in said barrel, comprising a body, a collar at each end of said body, packing outside the collars, a screwed extension on the forward end of the body, a striker connected to said extension, a reservoir for compressed air surrounding one end of said barrel, a communication between the reservoir and the barrel, means for checking the piston at the outer end of the barrel, means for holding said piston against the air pressure, and for releasing it to permit said air to act thereon, and means for effecting the withdrawal of the striker from the animal.

In witness whereof I have hereunto signed my name in the presence of the two undersigned witnesses.

CHARLES RANSOM.

Witnesses:
 GEORGE HIBBERT ROGERS,
 NOEL WHITMEE.

Copies of this patent may be obtained for five cents each, by addressing the "Commissioner of Patents, Washington, D. C."